(12) United States Patent
Zhou et al.

(10) Patent No.: US 12,139,337 B2
(45) Date of Patent: Nov. 12, 2024

(54) WAREHOUSING LINE, WAREHOUSING MANAGEMENT METHOD AND DEVICE

(71) Applicant: BEIJING XIAOMI MOBILE SOFTWARE CO., LTD., Beijing (CN)

(72) Inventors: Yi Zhou, Beijing (CN); Hu Yang, Beijing (CN); Anbao Zhou, Beijing (CN); Tao Huang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 905 days.

(21) Appl. No.: 17/209,972

(22) Filed: Mar. 23, 2021

(65) Prior Publication Data
US 2022/0033184 A1 Feb. 3, 2022

(30) Foreign Application Priority Data
Jul. 31, 2020 (CN) .......................... 202010760532.0

(51) Int. Cl.
*B65G 1/04* (2006.01)
*B65G 1/137* (2006.01)

(52) U.S. Cl.
CPC ......... *B65G 1/0492* (2013.01); *B65G 1/1373* (2013.01)

(58) Field of Classification Search
CPC ....... B65G 1/0492; B65G 61/00; G06Q 10/08
See application file for complete search history.

(56) References Cited

U.S. PATENT DOCUMENTS

| 5,636,966 A * | 6/1997 | Lyon .................... B65G 1/1378 |
| | | 414/789.6 |
| 8,965,559 B2 * | 2/2015 | Pankratov .............. B65G 57/09 |
| | | 700/228 |
| 9,927,815 B2 * | 3/2018 | Nusser .................. B65G 1/137 |

(Continued)

FOREIGN PATENT DOCUMENTS

| CN | 107902316 A | 4/2018 |
| CN | 109335430 A | 2/2019 |

(Continued)

OTHER PUBLICATIONS

Translation of JP 2007254078 A (Year: 2007).*

(Continued)

*Primary Examiner* — Timothy R Waggoner
(74) *Attorney, Agent, or Firm* — Cozen O'Connor

(57) ABSTRACT

A warehousing line, a warehousing management method and device may include: a storage device, provided with a plurality of storage locations, wherein each storage location is provided with a location sensor configured to determine storage information of the storage location; a first conveyor device, configured to convey items to or from the storage device, wherein the first conveyor device is provided with a first information collection element configured to collect information of each item on the first conveyor device; a first stacking device, configured to move the item from the first conveyor device to a corresponding storage location of the plurality of storage locations, or to move the item in one of the plurality of storage locations to the first conveyor device; and a warehousing management system in communication connection with the location sensors, the first information collection element and the first stacking device respectively.

16 Claims, 6 Drawing Sheets

(56) References Cited

U.S. PATENT DOCUMENTS

| | | | |
|---|---|---|---|
| 10,366,561 B2* | 7/2019 | Collette | G07F 17/34 |
| 11,488,323 B2* | 11/2022 | Diankov | B65B 57/00 |
| 2004/0094253 A1* | 5/2004 | Jenkins | B65C 9/42 |
| | | | 156/542 |
| 2004/0220694 A1 | 11/2004 | Stingel et al. | |
| 2008/0046116 A1* | 2/2008 | Khan | B25J 9/1687 |
| | | | 700/215 |
| 2011/0252986 A1* | 10/2011 | Pitzer | B65B 61/26 |
| | | | 101/45 |

FOREIGN PATENT DOCUMENTS

| | | | |
|---|---|---|---|
| CN | 111099374 A | 5/2020 | |
| CN | 111252432 A | 6/2020 | |
| JP | H0558405 A | 3/1993 | |
| JP | 2007254078 A | 10/2007 | |

OTHER PUBLICATIONS

Translation of JP H0558405 A (Year: 1993).*
Chinese Patent Application No. 202010760532.0, Office Action dated Feb. 3, 2023, 10 pages.
Chinese Patent Application No. 202010760532.0, English translation of Office Action dated Feb. 3, 2023, 10 pages.
European Patent Application No. 21165038.7 extended search and opinion dated Sep. 15, 2021, 38 pages.

* cited by examiner

WAREHOUSING LINE, WAREHOUSING MANAGEMENT METHOD AND DEVICE

CROSS-REFERENCE TO RELATED APPLICATION

This application is based on and claims priority to Chinese Patent Application Serial No. 202010760532.0, filed on Jul. 31, 2020, the entire contents of which are incorporated herein by reference.

TECHNICAL FIELD

The disclosure relates to a field of warehousing management technologies, and more particularly to a warehousing line, a warehousing management method and device.

BACKGROUND

In industrial production, a large number of product storage procedures are involved. In the process of product storage, the products need to be moved from the production line to the warehouse, but also need to be moved out of the warehouse. In the related art, the management of out-of-warehouse and entering-warehouse depends on manual registration, which is not only cumbersome and inefficient, but also easy to make mistakes, resulting in management chaos.

SUMMARY

A first aspect of embodiments of the present disclosure provides a warehousing line, including:
- a storage device, provided with a plurality of storage locations, wherein each storage location is provided with a location sensor, and the location sensor is configured to determine storage information of each of the plurality of storage locations;
- a first conveyor device, configured to convey items to or from the storage device, wherein the first conveyor device is provided with a first information collection element, and the first information collection element is configured to collect information of each item on the first conveyor device;
- a first stacking device, configured to move each item from the first conveyor device to a corresponding storage location of the plurality of storage locations, or to move the item from one of the plurality of storage locations to the first conveyor device; and
- a warehousing management system in communication connection with each location sensor, the first information collection element and the first stacking device respectively.

A second aspect of embodiments of the present disclosure, a warehousing management method is provided. The method is applied to a warehousing management system of a warehousing line, and includes:
- receiving storage information of storage locations collected by respective location sensors, wherein the storage information comprises stored and not stored;
- receiving information of an item on a first conveyor device collected by the first information collection element, wherein the item is conveyed towards a storage device;
- allocating one of the storage locations, having the storage information of not stored, for the item according to the storage information of respective storage locations, and labeling a state of the item as entering-warehouse; and
- sending an allocation result and a first entering-warehouse instruction to a first stacking device, so that the first stacking device moves the item to the corresponding storage location according to the allocation result, and updating the storage information of the storage location as stored.

A third aspect of embodiments of the present disclosure provides a warehousing management device. The device is applied to a warehousing management system of a warehousing line, and includes a processor and a memory. The memory is configured to store instructions executable by the processor. The processor is configured to implement the method described in the second aspect by executing the instructions stored in the memory.

A fourth aspect of embodiments of the present disclosure provides a computer readable storage medium, stored thereon with a computer program that, when executed by a processor, the method described in the second aspect is implemented.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

The exemplary embodiments will be described in detail here, and examples thereof are illustrated in the accompanying drawings. When the following descriptions refer to the accompanying drawings, unless otherwise indicated, the same numbers in different drawings represent the same or similar elements. The implementations described in the following exemplary embodiments do not represent all implementations consistent with the disclosure. Rather, they are only examples of apparatuses and methods consistent with some aspects of the disclosure as detailed in the appended claims.

The terms used in this disclosure are for the purpose of describing specific embodiments only and are not intended to limit this disclosure. The singular forms "a", "said" and "the" used in the specification of the disclosure and the attached claims are also intended to include plural forms, unless the context clearly implies otherwise. It should also be understood that the term "and/or" used in this context means and includes any or all possible combinations of one or more associated listed items.

It should be understood that, although terms "first", "second", "third" and the like may be used in this disclosure to describe the information, such information shall not be limited to these terms. These terms are used only to distinguish the same type of information from one another. For example, without departing from the scope of this disclosure, the first information may also be referred to as the second information, and similarly, the second information may also be referred to as the first information. Depending on the context, the word "if" used here can be interpreted as "upon" or "when" or "in response to determining".

In industrial production, a large number of product storage procedures are involved. In the process of product storage, the products need to be moved from the production line to the warehouse, but also need to be moved out of the warehouse. In the related art, the management of out-of-warehouse and entering-warehouse depends on manual registration, which is not only cumbersome and inefficient, but also easy to make mistakes, resulting in management chaos.

Moreover, in the related art, human or simple convey lines (such as pulley) are used for conveying, which does not only have low efficiency and high cost, but also has poor flexibility. Therefore, there are higher requirements for storage space, and a utilization rate of the storage space is low. Furthermore, the products are stacked before being warehoused, which increases the conveying load and conveying difficulty. Moreover, the products are in the stacking state during the whole storage process, which is easy to cause damage to the products.

Figure 1:
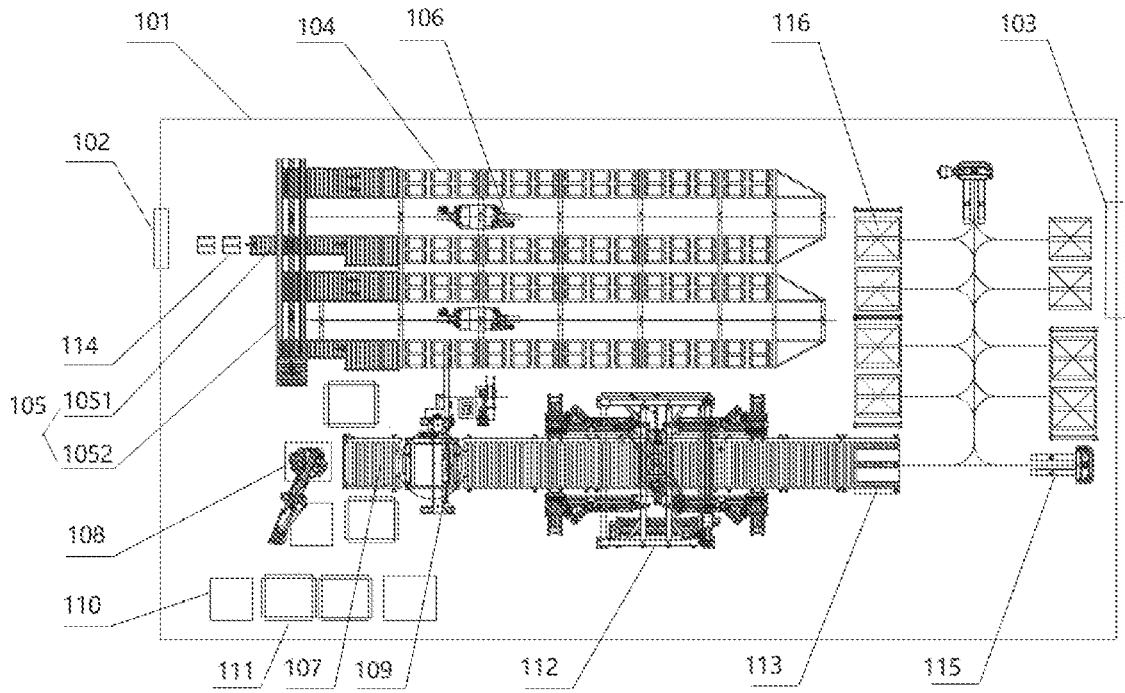
FIG. 1 is a schematic diagram of a warehousing line illustrated according to an exemplary embodiment of the present disclosure.

Based on this, in a first aspect, at least one embodiment of the present disclosure provides a warehousing line. Referring to FIG. 1, a structure of the warehousing line is shown. The warehousing line may be provided in a storage space, as illustrated in FIG. 1. In a preferred embodiment, the storage space 1 may be a warehouse, a goods station or the like. The storage space 101 may be provided with an entrance 102 and an exit 103. When there is an item to enter a warehouse, it enters through the entrance 102. When there is an item to be out of warehouse, it goes out from the exit 103. An area and a shape of the storage space 101 may be designed according to the structure of the warehousing line described below, as long as it may ensure running of the warehousing line, which is not limited in embodiments of the present disclosure.

The warehousing line includes a storage device 104. The storage device 104 is provided with a plurality of storage locations. Each storage location 104 is provided with a location sensor. The location sensor is configured to determine storage information of the corresponding storage location.

The location sensor may be implemented by a weight sensor, a light sensor (for example, an opposite-type photoelectric sensor) or the like, which is not limited in embodiments of the present disclosure. When the weight sensor is adopted, it is provided at the bottom of the storage location. When the light sensor is adopted, it is provided on a side of the storage location.

In an example, the storage device 104 includes a plurality of three-dimensional storage shelves. The plurality of storage shelves may be arranged in parallel. For example, the storage locations of each three-dimensional storage shelf may be in a form of 14 columns*8 rows*10 layers. Using the three-dimensional storage shelves may increase the number of storage locations, improve the utilization rate of the storage space, and meanwhile may avoid stacking the items during the storage procedure, avoid damage to products. Further, there is no need to stack the items in advance, which may also reduce the conveying load and conveying difficulty, and improve the conveying flexibility.

The warehousing line further includes a first conveyor device 105. The first conveyor device 105 is configured to convey the item to or from the storage device 104. The first conveyor device 105 is provided with a first information collection element (not shown). The first information collection element is configured to collect information of each item on the first conveyor device 105.

The item may be provided with an information identifier such as a bar code and a QR code at a fixed position when it is packed in the upstream industry line. The information identifier is integrated with information such as a type, a serial number and an order number of the item. The first information collection element may be an automatic code scanning device, which may scan the information identifier such as the bar code and the QR code on the item, and thus obtain the information of the item. For example, the first information collection element may be an infrared collector, which emits infrared rays in real time. When the item enters into an infrared range of the infrared collector, the infrared collector automatically scans the information identifier, which is efficient and fast, reliable and stable.

In an example, for matching the plurality of three-dimensional storage shelves 104 arranged in parallel, the first conveyor device 105 includes a plurality of first conveyor belts 1051 and at least one second conveyor belt 1052. Each first conveyor belt 1051 is corresponding to one three-dimensional storage shelf, and is configured to convey the item to or from the corresponding three-dimensional storage shelf. The second conveyor belt 1052 is configured to move the item on one of the first conveyor belts 1051 to another one of the first conveyor belts 1051. That is, each first conveyor belt 1051 is provided on an extension of the three-dimensional storage shelf. The first conveyor belt 1051 may be implemented by a roller conveyor. The second conveyor belt 1052 may be provided at starting points of respective first conveyor belts 1051, and be perpendicular to respective first conveyor belts 1051. The second conveyor belt 1052 may be implemented by a belt conveyor, and may include components like a push bar. The function of the second conveyor belt 1052 is to allocate items for respective first conveyor belts 1051, that is, allocate the items alternately to respective first conveyor belts 1051. Further, a length of one of the first conveyor belts 1051 may set to be greater than that of any other of the first conveyor belts 1051, that is, such the first conveyor belt 1051 protrudes beyond the second conveyor belt 1052, and the protruded part may form a receiving area, in which items coming from the upstream industry line may be put, and from which the items enter the warehouse.

The warehousing line further includes a first stacking device 106. The first stacking device 106 is configured to move the item from the first conveyor device 105 to the corresponding storage location, or move the item in the corresponding storage location to the first conveyor device 105.

The first stacking device 106 may be implemented by an automatic stacker, which consists of a three-axis motion mechanism, a PLC, a servo motor and a photoelectric switch. Moreover, it is possible to provide a plurality of first stacking devices 106, the number of which may depend on the number of three-dimensional storage shelves. For example, for every two three-dimensional storage shelves, one first stacking device 106 may be provided, and the first stacking device 106 may be provided between these two three-dimensional storage shelves. During allocating items for respective first conveyor belts 1051 mentioned above, the situation of the first stacking devices 106 may be considered, such that the adjacent items are allocated to the first conveyor belts 1051 responsible by different first stacking devices 106.

The warehousing line further includes a warehousing management system (WMS, not shown). The warehousing management system is in communication connection with the location sensors in respective storage locations, the first information collection element and the first stacking device 106 respectively.

The first information collection element may send the collected information of items on the first conveyor device 105 to the warehousing management system (WMS), and the warehousing management system (WMS) may obtain the storage information of corresponding storage locations collected by the respective location sensors, and thus the warehousing management system (WMS) may allocate the storage location for each item, and may control the first stacking device 106 to move the items according to the determined correspondence relationship. In addition, the warehousing management system may also store state information of respective items, achieving intelligent management and automatic warehousing of the items in the storage space.

In embodiments of the present disclosure, the storage device 104 having a plurality of storage locations is provided, and each storage location is provided with the location sensor for determining its storage information. Since the location sensors are in communication connection with the warehousing management system, the warehousing management system can obtain the storage situation of the storage device 104 in real time, and by providing the first conveyor device 105 and the first stacking device 106 in communication connection with the warehousing management system, can control them to complete conveying and moving of the items, which is flexible and convenient, increases utilization of the storage space, and achieves fully automatic warehousing and out-of-warehouse. The first information collection element provided on the first conveyor device 105 can collect the information of the conveyed item, and upload the information to the warehousing management system, which further increases the efficiency and reliability of warehousing management, avoids burdensome manual registration, improves the management quality, and avoids management chaos.

Continuing to refer to FIG. 1, in some embodiments of the present disclosure, the warehousing line further includes a second conveyor device 107 and a second stacking device 108. The second conveyor device 107 is configured to convey storage units. A second information collection element (not shown), a packing component and a third information collection element (not shown) are arranged in sequence along the conveying direction of the second conveyor device 107. Both the second information collection element and the third information collection element are configured to collect information of items in the storage unit. The second stacking device 108 is configured to stack packing materials and items on the first conveyor device 105 onto the second conveyor device 107, to form the storage unit. Each of the second information collection element, the third information collection element, the packing component, and the second stacking device 108 is in communication connection with the warehousing management system.

The second conveyor device 107 may consist of a roller conveyor, may be arranged in parallel with the first conveyor belt 1051, and a starting point of which is close to one end of the second conveyor belt 1052, for facilitating conveying the items therebetween. The working principle of the second information collection element and the third information collection element is same as that of the first information collection element, and will not be elaborated here. The packing materials may include pallets 110 and packing elements 111 such as top covers, lower covers and corner beads. The second stacking device 108 may be implemented by a stacking robot, the main part of which is a six-axis robot, and including auxiliary mechanisms such as a visual module and a communication module. An operation range of the second stacking device 108 may cover the starting point of the second conveyor device 107 and one end of the second conveyor belt 1052. Therefore, the second stacking device 108 may move the item from one end of the second conveyor belt 1052 to the starting point of the second conveyor device 107. Meanwhile, the packing materials may be put in the operation range of the second stacking device 108 for easy access. In detail, the second stacking device 108 first puts the pallet 110 at the starting point of the second conveyor device 107, and the puts the lower cover on the pallet, and then continuously puts a plurality of items onto the lower cover, and finally puts the top cover and the corner bead, to complete the storage unit. The collection range of the second information collection element is at the starting point of the second conveyor device. Therefore, when each item is put, the second information collection element may synchronously collect the information of the item.

In an example, the packing component includes a strapping machine 109, a wrapping machine 112 and a labeler 113 arranged in sequence along the conveying direction of the second conveyor device. The labeler 113 includes a weight sensor.

In embodiments of the present disclosure, by providing the second conveyor device 107 and the second stacking device 108, the out-of-warehouse of the items and the stacking and packing of the items during the out-of-warehouse procedure may be achieved, which further improves the intelligence and automation degree of the out-of-warehouse and enter-warehousing, and improves the efficiency and quality of the warehousing management.

Continuing to refer to FIG. 1, in some embodiments of the present disclosure, the warehousing line further includes an unmanned carrying system (not shown) in communication connection with the warehousing management system, and a first automatic guided vehicle 114 and a second automatic guided vehicle 115 in communication connection with the unmanned carrying system. The first automatic guided vehicle 114 is configured to carry the item from the upstream industry line to the first conveyor device 105. The second automatic guided vehicle 115 is configured to carry the storage unit from the second conveyor device 107 to a destination position.

The first automatic guided vehicle 114 (AGV cart) adopts visual navigation in cooperation with inertial navigation, and conducts tracking and obstacle avoidance by means of QR codes on the ground and a laser sensor. The first automatic guided vehicle 114 may go to the upstream industry line (for example, the packing line) to receive items, carry the items to the storage space, and puts them onto the receiving area of the first conveyor device 105. The second automatic guided vehicle 115 (AGD forklift) adopts a laser sensor to conduct path navigation, and may move the storage unit packed on the second conveyor device 107 to the destination position, for example, move to the outside of the storage space or to an output area in the storage space.

In embodiments of the present disclosure, by providing the automatic guided vehicles, the docking between the warehousing line and the upstream industry line and the downstream industry line can be achieved. Moreover, the automatic guided vehicles are flexible and convenient, which improves the utilization rate of the storage space.

Figure 2:
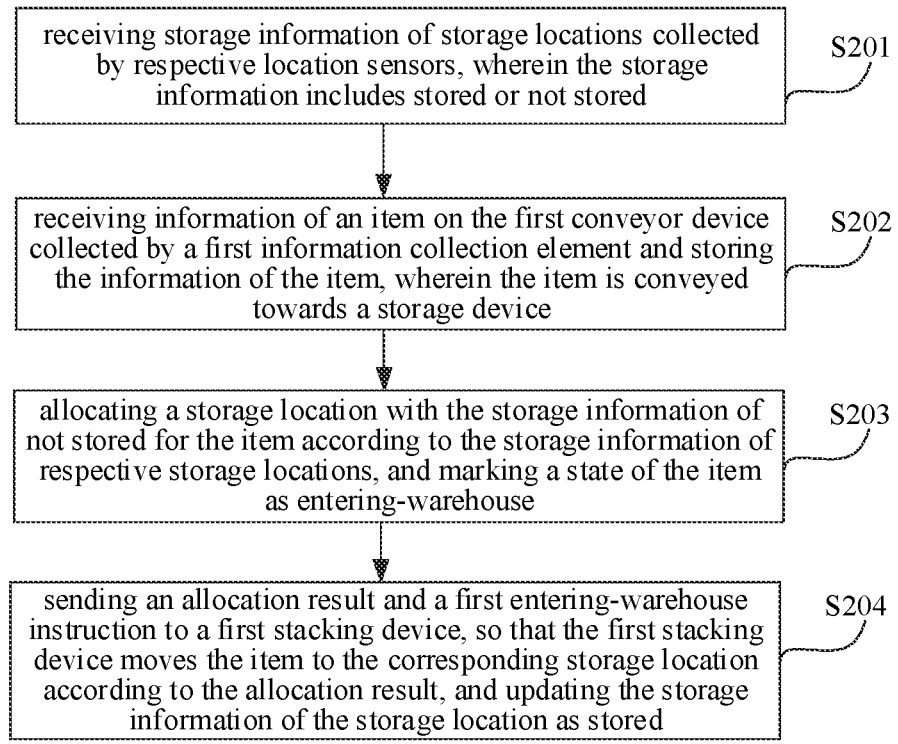
FIG. 2 is a flow chart of a warehousing management method according to an exemplary embodiment of the present disclosure.

In a second aspect, at least one embodiment of the present disclosure provides a warehousing management method. Referring to FIG. 2, which illustrates the flowchart of the management method, the management method includes blocks S201-S204. The management method is applied to a warehousing management system of a warehousing line, that is, may be applied to the warehousing management system of the warehousing line provided by any embodiment in the first aspect, or may be applied to the warehousing management system of other warehousing line.

At block S201, storage information of storage locations is collected by respective location sensors. The storage information includes stored or not stored.

The respective location sensors may collect the storage information of corresponding storage locations in real time, that is, information about whether the storage location is stored with the item, and may send the collected storage information to the warehousing management system in real time. The warehousing management system may obtain the storage situation of the storage device by summarizing the storage information of all the storage locations, that is, may determine how many items are stored, and how many free storage locations there are. When there is an entering-warehouse request or an out-of-warehouse request, the warehousing management system needs to determine the entering-warehouse plan or out-of-warehouse plan according to the above storage situation.

At block S202, information of an item on the first conveyor device collected by a first information collection element is received and stored, in which the item is conveyed towards a storage device.

When there are items conveyed on the first conveyor device, the first information collection element may collection the information of each item in real time at the end, and send the collected information to the warehousing management system. In this way, the warehousing management system may determine which items need to enter the warehouse, achieving management for each item entering the warehouse, and avoiding missing the information of any item.

At block S203, a storage location with the storage information of not stored is allocated for the item according to the storage information of respective storage locations, and a state of the item is marked as entering-warehouse.

The warehousing management system may determine the number of items to enter the warehouse according to the information collected by the first information collection element, and check the number of storage locations without items. If the storage requirement can be satisfied (that is, the number of items to enter the warehouse is less than the number of storage locations without items), the warehousing management system allocates the storage location for each item to enter the warehouse based on a one-to-one correspondence relationship. In detail, the principle of proximity may be used. Then, the above correspondence relationship is stored, and the states of these items are marked as entering-warehouse. If the storage requirement cannot be satisfied (that is, the number of items to enter the warehouse is greater than the number of storage locations without items), the warehousing management system allocates storage locations for a part of the items to enter the warehouse and perform subsequent operations, and meanwhile issues an alarm.

At block 204, the allocation result and a first entering-warehouse instruction are sent to a first stacking device, so that the first stacking device moves the item to the corresponding storage location according to the allocation result, and the storage information of the storage location is updated as stored.

The warehousing management system controls the first stacking device to complement the entering-warehouse work of the items on the first conveyor device. At this time, the location sensors in these storage locations collect the storage information as stored, and thus sends this information to the warehousing management system. The warehousing management system updates the storage status in real time.

In embodiments of the present disclosure, the warehousing management system allocates the storage locations for the items to enter the warehouse, and updates the states of the items and the states of the storage locations in real time, and controls the first conveyor device and the first stacking device to complete moving and entering-warehouse operations of the items automatically, which is flexible and convenient, increases the utilization rate of the storage space, realizes fully automatic out-of-warehouse and entering-warehouse, increases the efficiency and reliability of warehousing management, avoids cumbersome manual registration, improves the management quality, and avoids management chaos, thereby greatly improving the automation degree and intelligence degree of the warehousing management.

Figure 3:
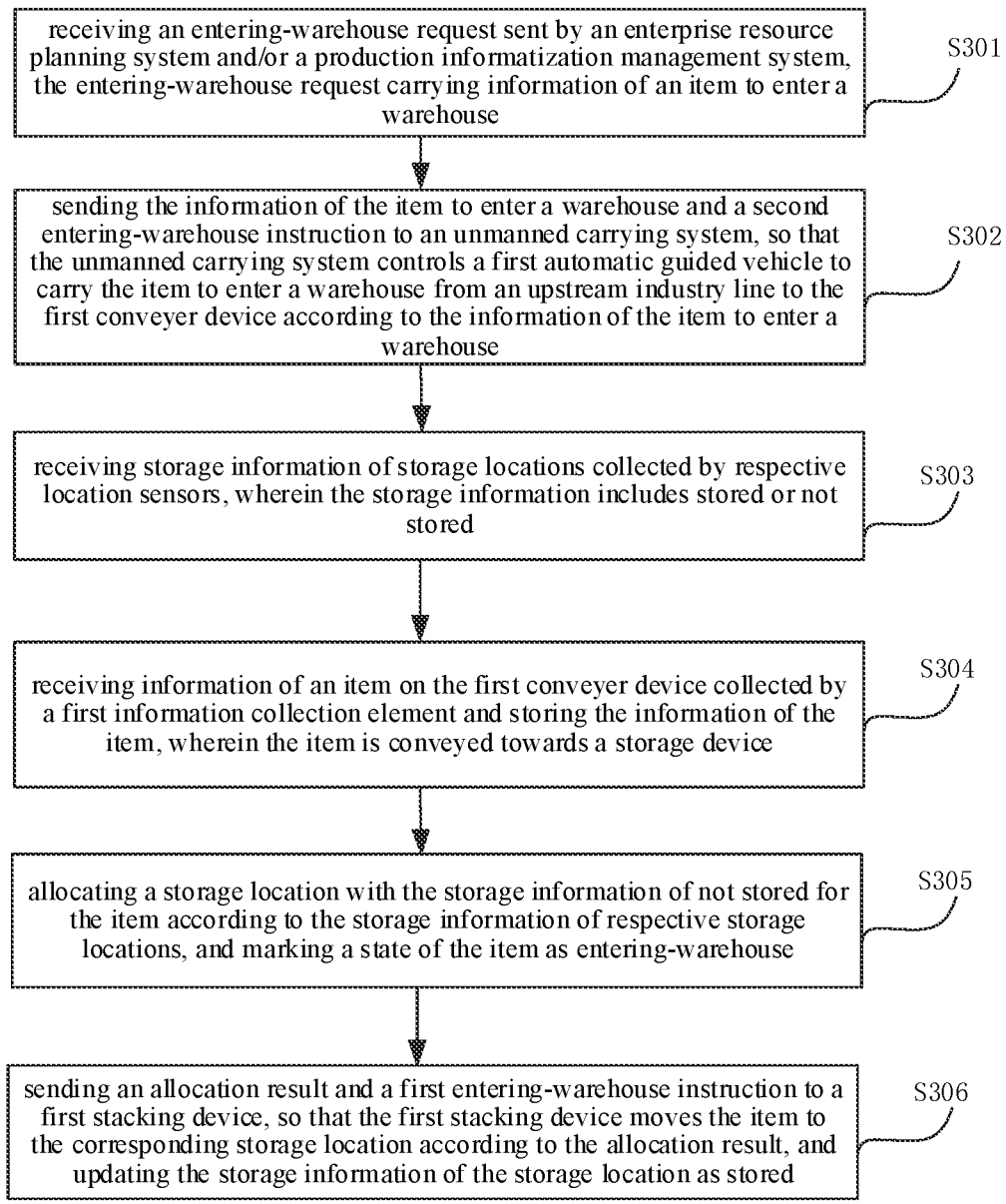
FIG. 3 is a flow chart of a warehousing management method according to another exemplary embodiment of the present disclosure.

Continuing to refer to FIG. 3, some embodiments of the present disclosure provide another warehousing management method. The method includes blocks S301-S306. Blocks S303-S306 are same as blocks S201-S204 of the warehousing management method in the embodiment shown in FIG. 2, and will not be elaborated here. In the following, only blocks S301 and S302 will be described in detail.

At block S301, an entering-warehouse request sent by an enterprise resource planning system and/or a production informatization management system is received, the entering-warehouse request carrying information of an item to enter the warehouse.

When the upstream industry line (for example, the packing line) completes the products, it will send the entering-warehouse request to the enterprise resource planning system and/or the production informatization management system. The enterprise resource planning system and/or the production informatization management system will determine whether the products could enter the warehouse according to the entering-warehouse request and the stored capacity of the storage device in the warehousing line, and send the entering-warehouse request to the warehousing management system in response to determining that they could enter the warehouse.

At block S302, the information of the item to enter the warehouse and a second entering-warehouse instruction to an unmanned carrying system, so that the unmanned carrying system controls a first automatic guided vehicle to carry the item to enter the warehouse from the upstream industry line to the first conveyor device according to the information of the item to enter the warehouse.

In embodiments of the present disclosure, the warehousing management system may directly communicate with the enterprise resource planning system and/or the production informatization management system, and may obtain the entering-warehouse request of the upstream industry line in time, and may control the first automatic guided vehicle to take the goods, which is flexible and convenient, and has fast response.

In embodiments of the present disclosure, after determining the result of allocating storage locations for respective items, the allocation result may be sent to the production informatization management system, so that the production informatization management system stores the allocation result and marks the storage information of corresponding items as stored. The production informatization management system may obtain and update the information of the items and the information of the storage device in real time, improving the speed and quality of sharing the information, and improving the intelligence and automation degree of the warehousing management.

Figure 4:
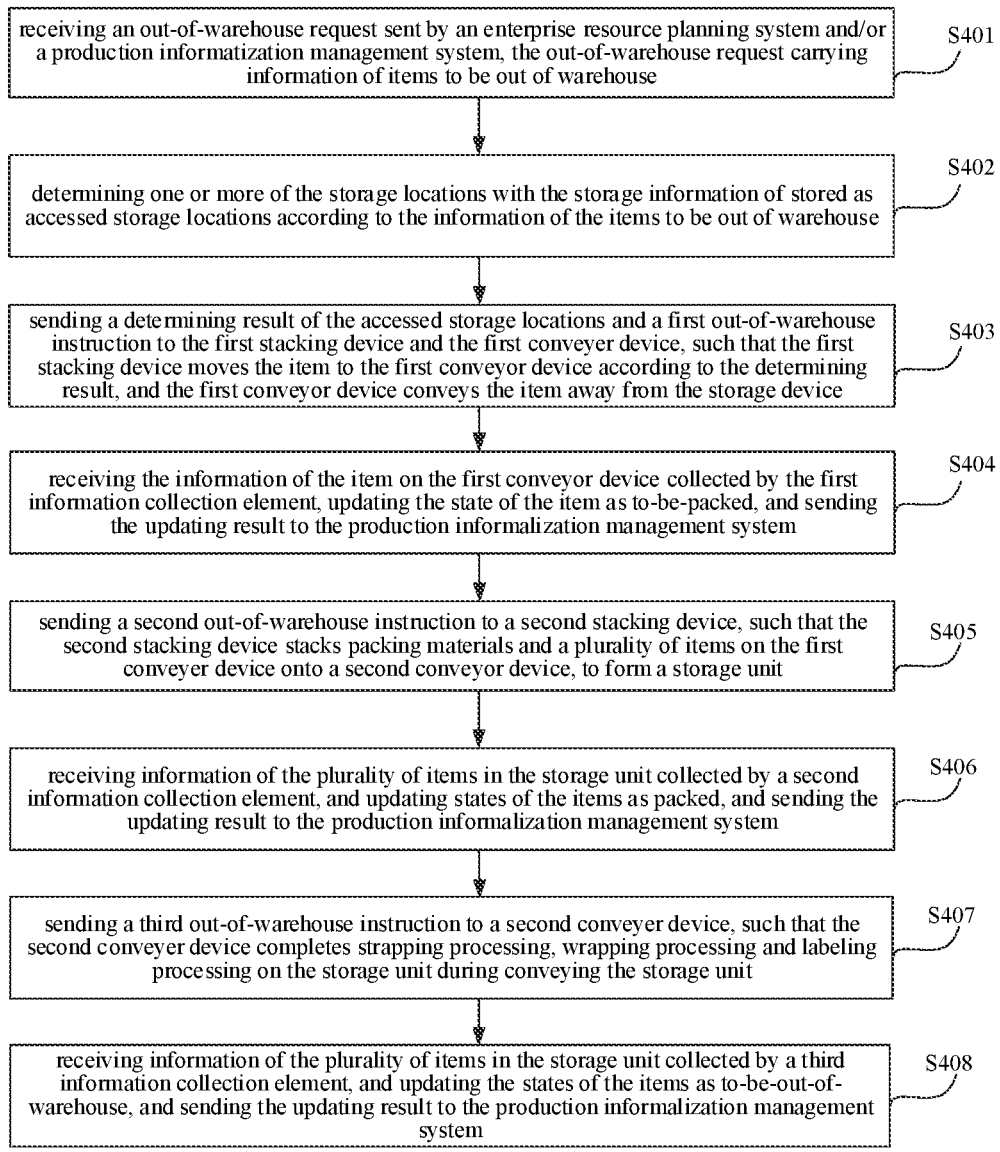
FIG. 4 is a flow chart of a warehousing management method according to yet another exemplary embodiment of the present disclosure.

Please refer to FIG. 4, some embodiments of the present disclosure further provide an out-of-warehouse procedure in the warehousing management method, which includes blocks S401-S408.

At block S401, an out-of-warehouse request sent by the enterprise resource planning system and/or the production informatization management system is received, the out-of-warehouse request carrying information of items to be out of warehouse.

At block S402, one or more of the storage locations with the storage information of stored are determined as accessed storage locations according to the information of the items to be out of warehouse.

At block S403, a determining result of the accessed storage locations and a first out-of-warehouse instruction are sent to the first stacking device and the first conveyor device, such that the first stacking device moves the item to the first conveyor device according to the determining result, and the first conveyor device conveys the item away from the storage device.

At block S404, the information of the item on the first conveyor device collected by the first information collection element is received, the state of the item is updated as to-be-packed, and the updating result is sent to the production informalization management system.

At block S405, a second out-of-warehouse instruction is sent to a second stacking device, such that the second stacking device stacks packing materials and a plurality of items on the first conveyor device onto a second conveyor device, to form a storage unit.

At block S406, information of the plurality of items in the storage unit collected by a second information collection element is received, and states of the items are updated as packed, and the updating result is sent to the production informalization management system.

At block S407, a third out-of-warehouse instruction is sent to a second conveyor device, such that the second conveyor device completes strapping processing, wrapping processing and labeling processing on the storage unit during conveying the storage unit.

At block S408, information of the plurality of items in the storage unit collected by a third information collection element is received, the states of the items are updated as to-be-out-of-warehouse, and the updating result is sent to the production informatization management system.

In embodiments of the present disclosure, during the above out-of-warehouse procedure, not only fully automation and intelligence is realized, but also the states of items out of the warehouse are updated in real time, which improves the quality and efficiency of the warehousing management, and provides convenience for the whole production.

In some embodiments of the present disclosure, the labeling processing on the storage unit is implemented as follows.

First, label information is determined according to the information of the plurality of items in the storage unit, in which the label information includes a number of the storage unit and information of the plurality of items in the storage unit. Next, the label information is sent to the labeler, such that the labeler prints a label according to the label information and sticks the label to the storage unit.

In some embodiments of the present disclosure, the labeler further includes a weight sensor, which will measure the weight of the storage unit when the storage unit is conveyed by the second conveyor device to the position corresponding to the labeler. If the weight satisfies a certain requirement, the label is stick to the storage unit, and the warehousing management system will send the third out-of-warehouse instruction to the unmanned carrying system, such that the unmanned carrying system controls a second automatic guided vehicle to carry the storage unit from the second conveyor device to the destination position. The destination position may be outside the storage space or may be an output area in the storage space.

Figure 5:
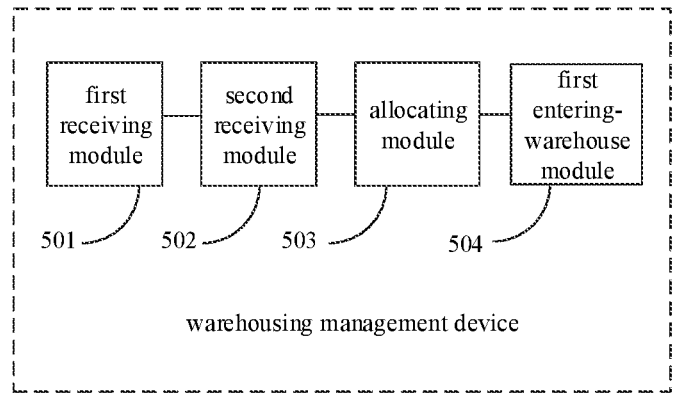
FIG. 5 is a block diagram of a warehousing management device according to an exemplary embodiment of the present disclosure.

According to a third aspect of embodiments of the present disclosure, a warehousing management device is provided. The warehousing management device is applied to a warehousing management system of a warehousing line. Refer to FIG. 5, a structure of the warehousing management device is shown. The warehousing management device includes a first receiving module 501, a second receiving module 502, an allocating module 503 and a first entering-warehouse module 504.

The first receiving module 501 is configured to receive storage information of storage locations collected by respective location sensors, in which the storage information includes stored or not stored.

The second receiving module 502 is configured to receive information of an item on the first conveyor device collected by a first information collection element and store the information of the item, wherein the item is conveyed towards a storage device.

The allocating module 503 is configured to allocate a storage location with the storage information of not stored for the item according to the storage information of respective storage locations, and mark a state of the item as entering-warehouse.

The first entering-warehouse module 504 is configured to send an allocation result and a first entering-warehouse instruction to a first stacking device, so that the first stacking device moves the item to the corresponding storage location according to the allocation result, and updating the storage information of the storage location as stored.

Figure 6:
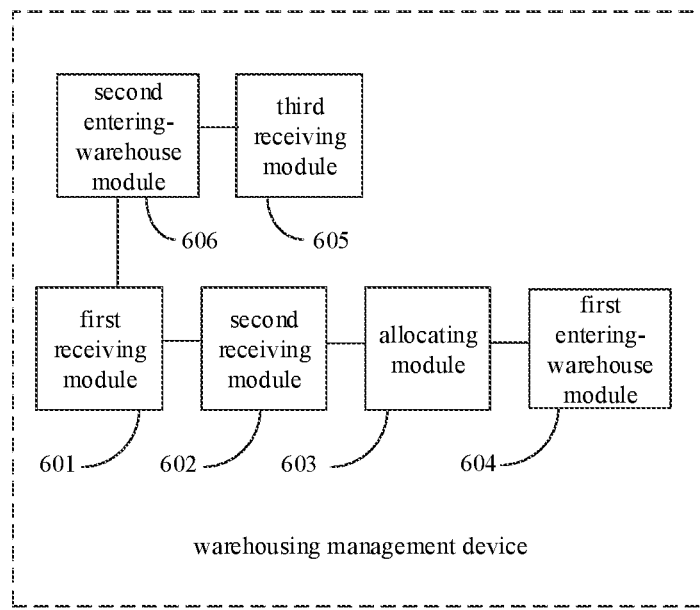
FIG. 6 is a block diagram of a warehousing management device according to another exemplary embodiment of the present disclosure.

Referring to FIG. 6, some embodiments of the present disclosure provide another warehousing management device, the difference between which and the warehousing management device show in FIG. 5 is that, in addition to the first receiving module 501, 601, the second receiving module 502, 602, the allocating module 503, 603 and the first entering-warehouse module 604, the device further includes a third receiving module 605 and a second entering-warehouse module 606.

The third receiving module 605 is configured to receive an entering-warehouse request sent by an enterprise resource planning system and/or a production informatization management system, the entering-warehouse request carrying information of an item to enter a warehouse.

The second entering-warehouse module 606 is configured to send the information of the item to enter a warehouse and a second entering-warehouse instruction to an unmanned carrying system, so that the unmanned carrying system controls a first automatic guided vehicle to carry the item to enter a warehouse from an upstream industry line to the first conveyor device according to the information of the item to enter a warehouse.

In some embodiments of the present disclosure, the warehousing management device further includes a first sending module.

The first sending module is configured to send the allocation result to the production informatization management system, so that the production informatization management system stores the allocation result, and marks storage information of the corresponding item as stored.

Figure 7:
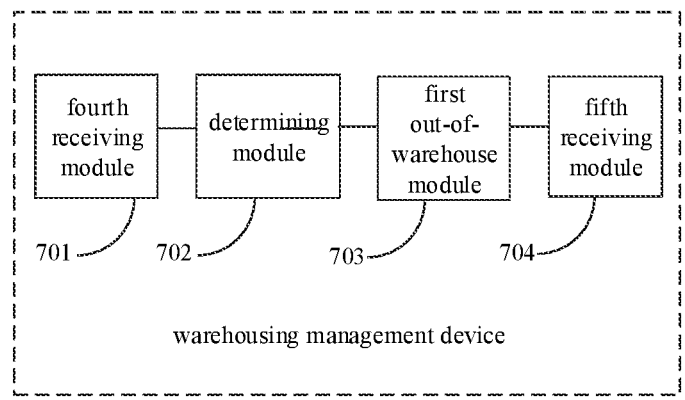
FIG. 7 is a block diagram of a warehousing management device according to yet another exemplary embodiment of the present disclosure.

Referring to FIG. 7, in some embodiments of the present disclosure, the warehousing management device further includes a fourth receiving module 701, a determining module 702, a first out-of-warehouse module 703 and a fifth receiving module 704.

The fourth receiving module 701 is configured to receive an out-of-warehouse request sent by an enterprise resource planning system and/or a production informatization management system, the out-of-warehouse request carrying information of items to be out of warehouse.

The determining module 702 is configured to determine one or more of the storage locations with the storage information of stored as accessed storage locations according to the information of the items to be out of warehouse.

The first out-of-warehouse module 703 is configured to send a determining result of the accessed storage locations and a first out-of-warehouse instruction to the first stacking device and the first conveyor device, such that the first stacking device moves the items to the first conveyor device according to the determining result, and the first conveyor device conveys the items away from the storage device.

The fifth receiving module 704 is configured to receive the information of the item on the first conveyor device collected by the first information collection element, update the state of the item as to-be-packed, and send the updating result to the production informalization management system.

Figure 8:
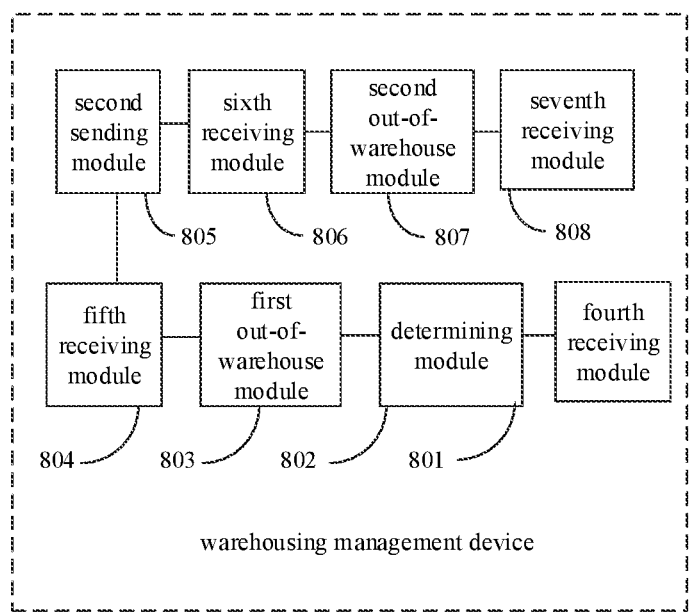
FIG. 8 is a block diagram of a warehousing management device according to still yet another exemplary embodiment of the present disclosure.

Referring to FIG. 8, in some embodiments of the present disclosure, in addition to the fourth receiving module 801, the determining module 802, the first out-of-warehouse module 803 and the fifth receiving module 804, the warehousing management device further includes a second sending module 805, a sixth receiving module 806, a second out-of-warehouse module 807 and a seventh receiving module 808.

The second sending module 805 is configured to send a second out-of-warehouse instruction to a second stacking device, such that the second stacking device stacks packing materials and a plurality of items on the first conveyor device onto a second conveyor device, to form a storage unit.

The sixth receiving module 806 is configured to receive information of the plurality of items in the storage unit collected by a second information collection element, update states of the items as packed, and send the updating result to the production informalization management system.

The second out-of-warehouse module 807 is configured to send a third out-of-warehouse instruction to a second conveyor device, such that the second conveyor device completes strapping processing, wrapping processing and labeling processing on the storage unit during conveying the storage unit.

The seventh receiving module 808 is configured to receive information of the plurality of items in the storage unit collected by a third information collection element, update the states of the items as to-be-out-of-warehouse, and send the updating result to the production informalization management system.

In some embodiments of the present disclosure, the second out-of-warehouse module is configured to complete the labeling processing on the storage unit by:

determining label information according to the information of the plurality of items in the storage unit, in which the label information comprises a number of the storage unit and information of the plurality of items in the storage unit; and sending the label information to a labeler, such that the labeler prints a label according to the label information and sticks the label to the storage unit.

In some embodiments of the present disclosure, the warehousing management device further includes a third out-of-warehouse module.

The third out-of-warehouse module is configured to send a third out-of-warehouse instruction to an unmanned carrying system, such that the unmanned carrying system controls a second automatic guided vehicle to move the storage unit from the second conveyor device to a destination position.

With respect to the device in the above embodiments, specific manners for respective modules performing operations have been described in detail in the related method embodiments and detailed descriptions thereof are omitted herein.

Figure 9:
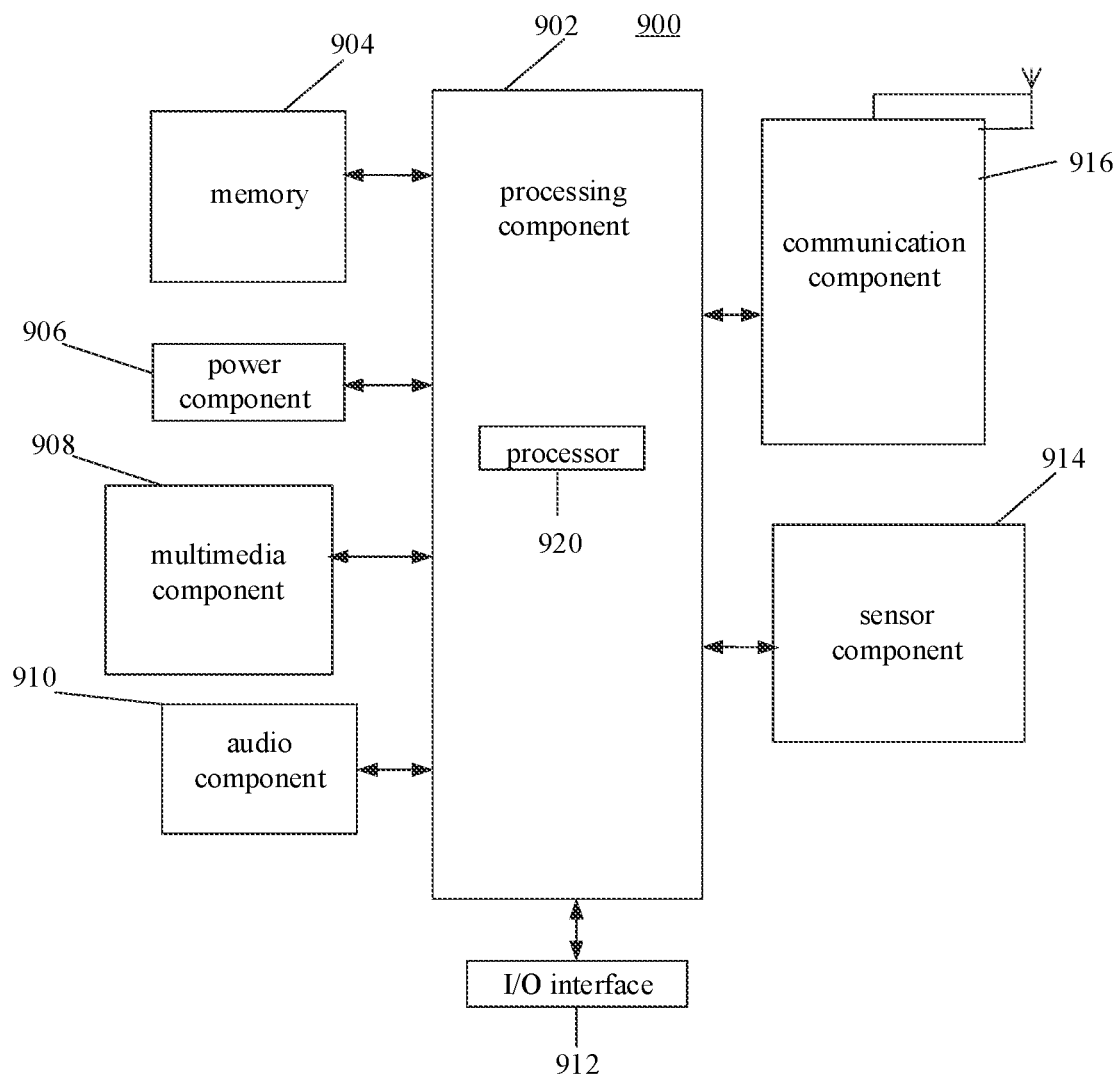
FIG. 9 is a block diagram of a smart device according to an exemplary embodiment of the present disclosure.

According to a fifth aspect of embodiments of the present disclosure, referring to FIG. 9, a block diagram of an electronic device is shown as an example. For example, the device 900 may be a mobile phone, a computer, a digital broadcasting terminal, a messaging device, a game console, a tablet device, a medical device, fitness equipment, a Personal Digital Assistant PDA, and the like.

As shown in FIG. 9, the device 900 may include the following one or more components: a processing component 902, a memory 904, a power component 906, a multimedia component 908, an audio component 910, an Input/Output (I/O) interface 912, a sensor component 914, and a communication component 916.

The processing component 902 typically controls overall operations of the electronic device 800, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 408 and the processing component 902.

The memory 904 is configured to store various types of data to support the operation of the 9 device 900. Examples of such data include instructions for any applications or methods operated on the device 900, contact data, phonebook data, messages, pictures, video, etc. The memory 804 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user, and the four corner of the screen are rounded. In some embodiments, the screen may include a liquid crystal display (LCD) and a press panel (TP). If the screen includes the press panel, the screen may be implemented as a press screen to receive input signals from the user. The press panel includes one or more press sensors to sense presses, swipes, and other gestures on the press panel. The press sensors may not only sense a boundary of a press or swipe action, but also sense a duration time and a pressure associated with the press or swipe action. In some embodiments, the multimedia component 908 includes a front camera and/or a rear camera. The front camera and/or the rear camera may receive external multimedia data while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the device 00 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface for the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900 and relative positioning of components (e.g. the display and the keypad of the device 900. The sensor component 914 may also detect a change in position of the device 900 or of a component in the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate wired or wireless communication between the device 900 and other devices. The device 900 can access a wireless network based on a communication standard, such as WIFI, 2G, or 3G, or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In a sixth aspect, in exemplary embodiments of the present disclosure, there is also provided a non-transitory computer readable storage medium including instructions, such as the memory 904 including instructions. The instructions may be performed by the processor 920 of the device 900 so as to realize the above method. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A warehousing line, comprising:
a storage device, provided with a plurality of storage locations, wherein each storage location is provided with a location sensor, and the location sensor is configured to determine storage information of each of the plurality of storage locations;
a first conveyor device, configured to convey items to or from the storage device, wherein the first conveyor device is provided with a first information collection element, and the first information collection element is configured to collect information of each item on the first conveyor device;
a first stacking device, configured to move each item from the first conveyor device to a corresponding storage location of the plurality of storage locations, or to move the item from one of the plurality of storage locations to the first conveyor device;

a warehousing management system in communication connection with each location sensor, the first information collection element, and the first stacking device respectively;

a second conveyor device, configured to convey a storage unit, wherein a second information collection element, a packing component and a third information collection element are sequentially arranged along a conveying direction of the second conveyor device, and each of the second information collection element and the third information collection element is configured to collect information of items in the storage unit; and a second stacking device, configured to stack packing materials and items on the first conveyor device onto the second conveyor device, to form the storage unit, wherein each of the second information collection element, the third information collection element, the packing component and the second stacking device is in communication connection with the warehousing management system.

2. The warehousing line of claim 1, wherein the storage device comprises a plurality of three-dimensional storage shelves;

the first conveyor device comprises a plurality of first conveyor belts and at least one second conveyor belt, in which each of the first conveyor belts is corresponding to one three-dimensional storage shelf, and is configured to convey the items to or from the corresponding three-dimensional storage shelf, and the second conveyor belt is configured to move the items on one of the first conveyor belts to another of the first conveyor belts.

3. The warehousing line of claim 1, wherein the packing component comprises a strapping machine, a wrapping machine and a labeler arranged sequentially along the conveying direction of the second conveyor device, in which the labeler comprises a weight sensor.

4. The warehousing line of claim 1, further comprising an unmanned carrying system in communication connection with the warehousing management system and a first automatic guided vehicle and a second automatic guided vehicle both in communication connection with the unmanned carrying system, in which the first automatic guided vehicle is configured to carry the item from an upstream industry line to the first conveyor device, and the second automatic guided vehicle is configured to carry the storage unit from the second conveyor device to a destination position.

5. A warehousing management method, applied to a warehousing management system of a warehousing line, and comprising:

receiving storage information of storage locations collected by respective location sensors, wherein the storage information comprises stored or not stored;

receiving information of an item on a first conveyor device collected by a first information collection element, wherein the item is conveyed towards a storage device;

allocating one of the storage locations, having the storage information of not stored, for the item according to the storage information of respective storage locations, and marking a state of the item as entering-warehouse; and sending an allocation result and a first entering-warehouse instruction to a first stacking device, so that the first stacking device moves the item to the corresponding storage location according to the allocation result, and updating the storage information of the storage location as stored;

wherein the method further comprises:

sending a second out-of-warehouse instruction to a second stacking device, such that the second stacking device stacks packing materials and a plurality of items on the first conveyor device onto a second conveyor device, to form a storage unit;

receiving information of the plurality of items in the storage unit collected by a second information collection element, and updating states of the items as packed, and sending the updating result to a production informalization management system;

sending a third out-of-warehouse instruction to a second conveyor device, such that the second conveyor device completes strapping processing, wrapping processing and labeling processing on the storage unit during conveying the storage unit; and receiving information of the plurality of items in the storage unit collected by a third information collection element, and updating the states of the items as to-be-out-of-warehouse, and sending the updating result to the production informalization management system.

6. The warehousing management method of claim 5, further comprising:

receiving an entering-warehouse request sent by one or both of an enterprise resource planning system and a production informatization management system, the entering-warehouse request carrying information of an item to enter a warehouse;

sending the information of the item to enter a warehouse and a second entering-warehouse instruction to an unmanned carrying system, so that the unmanned carrying system controls a first automatic guided vehicle to carry the item to enter the warehouse from an upstream industry line to the first conveyor device according to the information of the item to enter a warehouse.

7. The warehousing management method of claim 5, further comprising:

sending the allocation result to a production informatization management system, so that the production informatization management system stores the allocation result, and marks storage information of the corresponding item as stored.

8. The warehousing management method of claim 5, further comprising:

receiving an out-of-warehouse request sent by an enterprise resource planning system and/or the production informatization management system, the out-of-warehouse request carrying information of items to be out of warehouse;

determining one or more of the storage locations with the storage information of stored as accessed storage locations according to the information of the items to be out of warehouse;

sending a determining result of the accessed storage locations and a first out-of-warehouse instruction to the first stacking device and the first conveyor device, such that the first stacking device moves the item to the first conveyor device according to the determining result, and the first conveyor device conveys the item away from the storage device;

receiving the information of the item on the first conveyor device collected by the first information collection element, updating the state of the item as to-be-packed, and sending the updating result to the production informalization management system.

9. The warehousing management method of claim 5, wherein completing the labeling processing on the storage unit comprises:
  determining label information according to the information of the plurality of items in the storage unit, in which the label information comprises a number of the storage unit and information of the plurality of items in the storage unit; and
  sending the label information to the labeler, such that the labeler prints a label according to the label information and sticks the label to the storage unit.

10. The warehousing management method of claim 5, further comprising:
  sending a third out-of-warehouse instruction to an unmanned carrying system, such that the unmanned carrying system controls a second automatic guided vehicle to move the storage unit from the second conveyor device to a destination position.

11. A warehousing management device, applied to a warehousing management system of a warehousing line, comprising:
  a processor; and
  a memory, configured to store instructions executable by the processor,
  wherein the processor is configured to:
  receive storage information of storage locations collected by respective location sensors, wherein the storage information comprises stored or not stored;
  receive information of an item on a first conveyor device collected by a first information collection element and store the information of the item, wherein the item is conveyed towards a storage device;
  allocate a storage location with the storage information of not stored for the item according to the storage information of respective storage locations, and mark a state of the item as entering-warehouse; and
  send an allocation result and a first entering-warehouse instruction to a first stacking device, so that the first stacking device moves the item to the corresponding storage location according to the allocation result, and updating the storage information of the storage location as stored;
  wherein the processor is further configured to:
  send a second out-of-warehouse instruction to a second stacking device, such that the second stacking device stacks packing materials and a plurality of items on the first conveyor device onto a second conveyor device, to form a storage unit;
  receive information of the plurality of items in the storage unit collected by a second information collection element, update states of the items as packed, and send the updating result to a production informalization management system;
  send a third out-of-warehouse instruction to a second conveyor device, such that the second conveyor device completes strapping processing, wrapping processing and labeling processing on the storage unit during conveying the storage unit; and
  receive information of the plurality of items in the storage unit collected by a third information collection element, update the states of the items as to-be-out-of-warehouse, and send the updating result to the production informalization management system.

12. The warehousing management device of claim 11, wherein the processor is further configured to:
  receive an entering-warehouse request sent by an enterprise resource planning system and/or a production informatization management system, the entering-warehouse request carrying information of an item to enter a warehouse;
  send the information of the item to enter a warehouse and a second entering-warehouse instruction to an unmanned carrying system, so that the unmanned carrying system controls a first automatic guided vehicle to carry the item to enter a warehouse from an upstream industry line to the first conveyor device according to the information of the item to enter a warehouse.

13. The warehousing management device of claim 11, wherein the processor is further configured to:
  send the allocation result to the production informatization management system, so that the production informatization management system stores the allocation result, and marks storage information of the corresponding item as stored.

14. The warehousing management device of claim 11, wherein the processor is further configured to:
  receive an out-of-warehouse request sent by an enterprise resource planning system and/or a production informatization management system, the out-of-warehouse request carrying information of items to be out of warehouse;
  determine one or more of the storage locations with the storage information of stored as accessed storage locations according to the information of the items to be out of warehouse;
  send a determining result of the accessed storage locations and a first out-of-warehouse instruction to the first stacking device and the first conveyor device, such that the first stacking device moves the items to the first conveyor device according to the determining result, and the first conveyor device conveys the items away from the storage device;
  receive the information of the item on the first conveyor device collected by the first information collection element, update the state of the item as to-be-packed, and send the updating result to the production informalization management system.

15. The warehousing management device of claim 11, wherein the processor is configured to complete the labeling processing on the storage unit by:
  determining label information according to the information of the plurality of items in the storage unit, in which the label information comprises a number of the storage unit and information of the plurality of items in the storage unit; and
  sending the label information to a labeler, such that the labeler prints a label according to the label information and sticks the label to the storage unit.

16. The warehousing management device of claim 11, wherein the processor is further configured to:
  send a third out-of-warehouse instruction to an unmanned carrying system, such that the unmanned carrying system controls a second automatic guided vehicle to move the storage unit from the second conveyor device to a destination position.

* * * * *